United States Patent [19]

Shervington

[11] Patent Number: 5,073,039
[45] Date of Patent: Dec. 17, 1991

[54] BEARING ASSEMBLY WITH THERMAL COMPENSATION

[75] Inventor: Roger M. Shervington, Rockford, Ill.

[73] Assignee: Sundstrand Corporation, Rockford, Ill.

[21] Appl. No.: 271,274

[22] Filed: Nov. 15, 1988

[51] Int. Cl.$^5$ .............................................. F16C 35/077
[52] U.S. Cl. .................................... 384/278; 384/493; 403/29
[58] Field of Search ............................ 403/28, 29, 30; 384/278, 295, 296, 438, 493, 557, 905, 476, 519, 535, 585

[56] References Cited

U.S. PATENT DOCUMENTS

| | | | |
|---|---|---|---|
| 2,324,676 | 6/1941 | Butterfield | 384/278 |
| 2,476,982 | 8/1945 | Iles | 384/493 |
| 2,590,761 | 3/1948 | Edgar | 384/278 |
| 2,700,581 | 3/1954 | Migny | 384/278 |
| 2,901,300 | 4/1956 | Burr | 384/278 |
| 2,936,199 | 9/1956 | Kelly | 384/493 |
| 3,194,616 | 1/1963 | Oprecht | 384/278 |
| 3,359,047 | 5/1965 | Andersen | 384/278 |
| 3,449,032 | 7/1965 | Scheufler | 384/278 |
| 3,454,313 | 6/1967 | Lohneis | 403/30 X |
| 3,657,780 | 4/1972 | Stolte | 29/148.4 R |
| 4,065,190 | 12/1977 | Hallerback | 384/493 |
| 4,218,273 | 8/1980 | Feist et al. | 156/60 |
| 4,226,485 | 10/1980 | Pruvot | 384/557 |
| 4,440,511 | 4/1984 | Ishibashi et al. | 384/278 |
| 4,442,733 | 4/1984 | Hartz | 403/29 X |
| 4,473,309 | 9/1984 | Box | 384/278 |
| 4,476,614 | 10/1984 | Pitroff | 29/148.4 A |
| 4,493,378 | 1/1985 | Kyle | 403/29 X |
| 4,611,934 | 9/1986 | Piotrowski et al. | 384/519 X |
| 4,701,057 | 10/1987 | Kashiwabara | 384/45 |
| 4,772,139 | 9/1988 | Bretton | 403/29 X |

Primary Examiner—Daniel P. Stodola
Assistant Examiner—William G. Battista, Jr.
Attorney, Agent, or Firm—Antonelli, Terry Stout & Kraus

[57] ABSTRACT

A temperature compensated shaft bearing support assembly in a magnesium alloy housing wall includes a liner made of a material which has a coefficient of thermal expansion between the coefficients of thermal expansion for the magnesium alloy and for the steel bearing. A support spigot has two hubs, one for supporting the shaft bearing and the other for supporting the liner that in turn is supported by the housing wall.

21 Claims, 1 Drawing Sheet

BEARING ASSEMBLY WITH THERMAL COMPENSATION

DESCRIPTION

1. Technical Field

This invention relates to a bearing assembly intended for operation over a large temperature range of several hundred degrees.

2. Background Art

In many applications it is necessary to support a radial bearing having components made of a material such as steel in a housing made of a low density alloy such, for example, as magnesium. One longstanding problem in connection with aircraft stems from the fact that the coefficient of thermal expansion of a light alloy is much larger than that of steel. The housing tends to expand away from the outer bearing race during a rise in the operating temperature of the assembly which can result in the loss of positive location of the bearing.

In the construction of a generator, for example, it is important to maintain the minimum rotor bearing clearance at all temperatures of operation. This is particularly important in two pole generators where, because of high rotational speed, a greater than minimum bearing clearance can result in the rotor orbiting with subsequent high vibration, noise and damage.

A problem has remained concerning how to attach the outer stationary element or race of a generator rotor ball bearing to the support wall of a magnesium alloy housing to maintain positive piloting at maximum ambient temperature of 350° F. while avoiding excessive stress in the housing wall at −65° F. and providing inherent flexibility to accommodate differential expansion over the full range of temperature.

DISCLOSURE OF INVENTION

It is an object of the present invention to provide a novel method for reducing stress build-up at low temperature extremes and for maintaining a stable location of the internal structures at high extremes of temperature.

Another object is to provide a novel apparatus capable of accommodating large temperature drops without damage due to low temperatures which cause hoop stresses and for maintaining close tolerances of mating diameters when operating at high temperatures.

In carrying out the present invention, the choice of a liner with an expansion rate approximately midway between the rates of thermal expansion of the other components is employed to control stresses while demanding less stringent manufacturing tolerances. A bearing support member in the form of a support spigot having a first hub for supporting the outer race of the bearing and a second hub opposite the first hub, for supporting the liner between the alloy housing and the support for the steel bearing allows the achievement of positive piloting at high ambient temperatures of while avoiding excessive stress in the housing wall at negative temperatures. An undercut on the second hub to give relief and provide resilience at low temperatures may also be advantageous.

These and other objects of the invention will become more fully apparent from the claims and from the description when read in conjunction with the drawings.

BEST MODE FOR CARRYING OUT THE INVENTION

Figure 1:
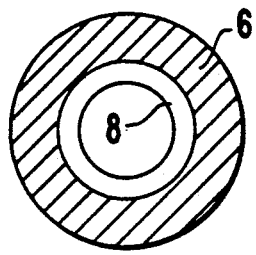
FIG. 1 is a diagrammatic view of the housing wall and outer race of a steel ball bearing shown at room temperature.
Figure 2:
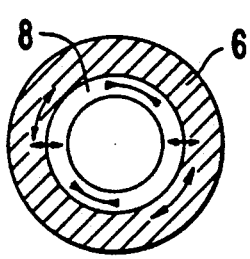
FIG. 2 is a view similar to FIG. 1 but shown at conditions of minimum temperature.
Figure 3:
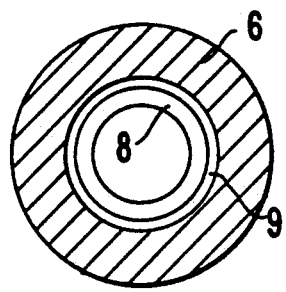
FIG. 3 is a view similar to FIG. 1 where the parts are shown at conditions of maximum temperature.

FIGS. 1-3 show the essential nature of the problem. A steel insert 8 is made to fit exactly into an magnesium alloy ring 6 at room temperature as shown in FIG. 1. As the temperature drops below room temperature and the magnesium alloy shrinks more rapidly than the steel, a compressive force exists between the two which causes compressive hoop stresses as shown in FIG. 2, in the steel insert 8 and tensile forces in the magnesium alloy ring 6.

Conversely, as the temperature rises, the magnesium alloy ring 6, with a greater rate of expansion than the steel insert 8, grows away from the insert 6 and creates a loose fit illustrated in FIG. 3 as an annular space 9 which is unacceptable where steel insert 8 constitutes the outer race of a bearing.

From the foregoing, it is apparent that if the steel insert 8 and the magnesium alloy ring 6 are sized to maintain contact over the complete temperature range, then excessively high stresses can exist at low temperature. Furthermore, close tolerance control of mating diameters is required to avoid exacerbating the situation.

Figure 4:
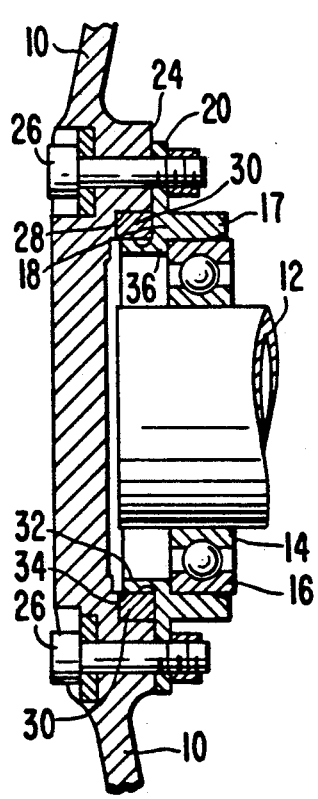
FIG. 4 is a view in section showing the assembly according to the present invention.
Figure 5:
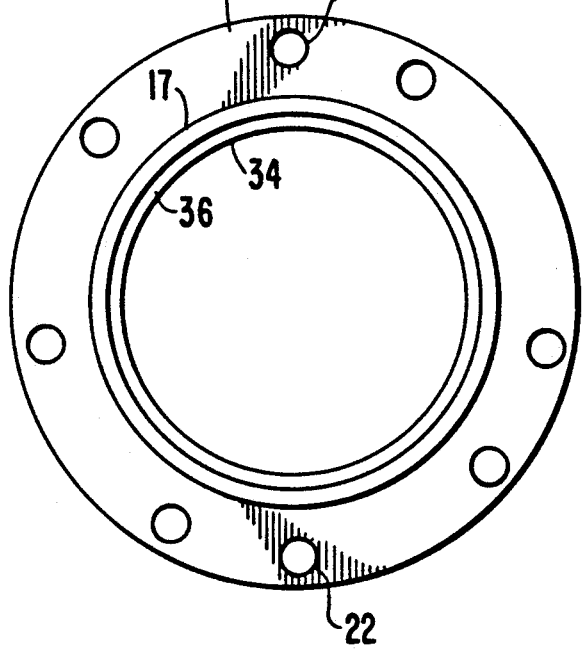
FIG. 5 is an end view of the support spigot present in the assembly shown in FIG. 4.

Referring now to FIG. 4, the housing end wall 10 for an electric dynamo such as a motor or generator is customarily used to support a shaft 12 for rotation in the bearing having an inner race 14 and an outer race 16. The outer race 16 is here shown to be press fit into an inwardly facing cylindrical surface of a first hub 17 of a bearing support spigot 18 which has a central flange 20. Flange 20 may have a plurality of bolt receiving apertures 22. Housing end wall 10 has a face 24 against which flange 20 is mounted as by bolts 26 on a bolt circle.

An inwardly facing surface 28 is located in the end wall 10 concentrically with the axis of rotation and receives the outwardly facing cylindrical surface of a liner 30. The liner 30 has an inwardly facing cylindrical surface 32 that receives an outwardly facing cylindrical surface 34 that is part of a second hub on bearing support spigot 18.

The bearing support spigot 18 thus has a central flange 20 with the first hub 17 and second hub 36 being positioned on opposite sides of a central plane of the flange 20.

The bearing support spigot 18 is made of a material having essentially the same thermal coefficient of expansion as the outer race 16 of the bearing. Typically, the thermal expansion rate of a steel bearing race is about 5μ"/°F. The housing wall 10, being a low density magnesium alloy, typically has a thermal expansion rate of as much as 15µ"/°F.

The liner 30 is made of a material such as stainless steel that has a thermal expansion rate preferably midway between the thermal expansion rates of the housing wall 10 and of the bearing support spigot 18. In an application where the outer race diameter 16 is nominally 2", a liner 30 having a radial thickness of about 0.2" has been found to be satisfactory.

The steel bearing support spigot 18 is located in a liner 30. The liner 30 has an outwardly facing cylindrical surface which is match machined with the surrounding inwardly facing surface 28 of housing wall 10 and is fitted into the inwardly facing cylindrical surface 28 of housing wall 10 as shown in FIG. 4. The liner 30 which is inserted cold into the heated housing 10, provides a press fit in the housing when both are at room temperature.

After assembly into housing 10, an inwardly facing cylindrical surface 32 of liner 30 is match machined to accept the press fit of the outwardly facing cylindrical surface 34 of hub 36 of the bearing support spigot 18. The support spigot 18 is similarly inserted cold into the heated liner 30 and thereafter clamped to the wall 10 with clamping screws 26 and self-locking nuts or equivalent fastening means.

The positioning of the outer race 16 of the bearing in the support spigot hub 17 occurs after close tolerance machining of the inwardly facing cylindrical surface of hub 17 to accept the outer surface of race 16. Since the steel bearing support spigot 18 is made of essentially the same material as the outer race 16 of the bearing, the required fit will remain sensibly constant over the full range of temperature because of the comparable thermal expansion rates of both of these components.

Figure 6:
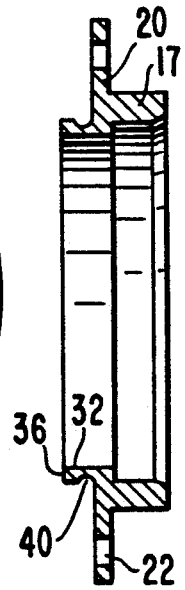
FIG. 6 is an elevation in section of a support spigot having an undercut in one of the hubs.

To provide increased resilience of the second hub 36 and to further relieve low temperature stress, a relief undercut 40 may be provided as shown in FIG. 6. Where hub 36 has a thickness of about 0.2", the undercut 40 may have a radius of about 20% of the thickness of hub 36.

While only a single embodiment of the invention has been described, all modifications and equivalents which fall within the scope of the claims are intended to be embraced thereby.

I claim:

1. Apparatus for critically positioning an internal structure made of a material having a low coefficient of thermal expansion by a housing wall made of a low density alloy having a coefficient of thermal expansion higher than that of the internal structure wherein an outwardly facing cylindrical surface of the internal structure is circumferentially engaged by an inwardly facing cylindrical surface comprising:
   a support spigot having a central flange with means for attachment to the housing wall around a bolt circle, said support spigot further comprising two hubs on opposite sides of said central flange with a first hub having said inwardly facing cylindrical surface that engages the circumferential surface of said internal structure and a second hub having an outwardly facing cylindrical surface and an inwardly facing surface that is free of engagement with any other structure;
   a liner having cylindrical inner and outer facing surfaces and made of a material having a coefficient of thermal expansion intermediate that of the internal structure and of said low density alloy, said liner being received on the outwardly facing cylindrical surface of said second hub and within an inwardly facing surface of said housing wall whereby radial displacement and circumferential retraction of said second hub occurs in response to contraction forces induced by said liner on said second hub.

2. Apparatus as defined in claim 1 wherein the liner has a coefficient of thermal expansion that is approximately midway between the corresponding coefficients of thermal expansion of said housing wall and said internal structure.

3. Apparatus as defined in claim 1, wherein said support spigot is fashioned as a rigid member.

4. Apparatus as defined in claim 1, wherein said first and second hubs are thermally coupled to each other.

5. Apparatus as defined in claim 1, wherein said liner is press-fitted on the outer facing cylindrical surface of said second hub.

6. Apparatus as defined in claim 1, wherein said liner is press-fitted at the inwardly facing surface of said housing wall.

7. A thermally responsive bearing assembly exposed to large temperature variations in a surrounding environment comprising:
   a shaft mounted for axial rotation;
   a radial bearing including an inner race mounted on said shaft and an outer race;
   a bearing support spigot having a centrally disposed radially extending flange with spaced bolt receiving apertures, a first hub extending toward said bearing from one flange side and a second hub which extends in an opposite direction from the opposite flange side;
   said bearing support spigot also having on said first hub a first inner facing surface for receiving the outer bearing surface, and on said second hub an outer facing cylindrical surface and an inner facing surface;
   a housing wall extending in a direction generally perpendicular to the shaft rotation axis with spaced bolt receiving apertures aligned with corresponding apertures in said spigot, said wall further having an inwardly facing cylindrical surface located radially inwardly of said bolt receiving apertures and positioned in radial alignment with the outwardly extending cylindrical surface of said second hub;
   said inner facing surface on said second hub being free of contact with any other part and constructed so as to allow unrestrained thermally induced radial displacement and circumferential retraction; and
   a liner having an outwardly facing cylindrical surface in contact with the inwardly facing cylindrical surface of said housing wall and an inwardly facing cylindrical surface in contact with the outwardly facing cylindrical surface of said second hub thereby to provide a compressive force on said second hub at temperatures lower than ambient.

8. The thermally responsive bearing assembly according to claim 7 wherein:
   the housing wall is made of a magnesium alloy having a first thermal expansion rate;
   the bearing support spigot is made of steel having a second thermal expansion rate lower than said first thermal expansion rate; and
   the liner is made of stainless steel having a thermal expansion rate greater than the thermal expansion rate of said spigot and less than the thermal expansion rate of said housing wall.

9. The thermally responsive bearing assembly as defined in claim 7 wherein an outer diameter of the liner is larger than a diameter of inwardly facing cylindrical surface diameter of the housing wall when both are at room temperature to provide an interference fit and wherein the outwardly facing cylindrical surface on the second hub in contact with the inwardly facing surface of the liner has an interference fit when the liner and the bearing support spigot are both at room temperature.

10. A thermally responsive bearing assembly as defined in claim 7, wherein said first and second hubs are thermally coupled to each other.

11. A thermally responsive bearing assembly as defined in claim 7, wherein said liner is press-fitted on the outer facing cylindrical surface of said second hub.

12. A thermally responsive bearing assembly according to claim 7, wherein said liner is press-fitted at the inwardly facing surface of said housing wall.

13. A thermally responsive bearing assembly comprising:
- a shaft mounted for axial rotation;
- a radial bearing including an inner race mounted on said shaft and an outer race;
- a bearing support spigot having a centrally disposed radially extending flange with spaced bolt receiving apertures, a first hub extending toward said bearing from one flange side and a second hub which extends in an opposite direction from the opposite flange side;
- said bearing support spigot also having on said first hub a first inner facing surface for receiving the outer bearing surface, and on said second hub an outer facing cylindrical surface;
- a housing wall extending in a direction generally perpendicular to the shaft rotation axis with spaced bolt receiving apertures aligned with corresponding apertures in said spigot, said wall further having an inwardly facing cylindrical surface located radially inwardly of said bolt receiving apertures and positioned in radial alignment with the outwardly extending cylindrical surface of said second hub;
- a liner having an outwardly facing cylindrical surface in contact with the inwardly facing cylindrical surface of said housing wall and an inwardly facing cylindrical surface in contact with the outwardly facing cylindrical surface of said second hub; and
- wherein a cylindrical wall of the second hub has a predetermined radial thickness that is substantially uniform except for an undercut at the junction between the flange and the outer cylindrical surface, said undercut being sufficient to allow a resilient relief without fracture of said second hub at low temperatures due to compression forces caused by contraction of said housing wall and liner.

14. A thermally responsive bearing assembly as defined in claim 13, wherein said first and second hubs are thermally coupled to each other.

15. A thermally responsive bearing assembly as defined in claim 13, wherein said liner is press-fitted on the outer facing cylindrical surface of said second hub.

16. A thermally responsive bearing assembly as defined in claim 13, wherein said liner is press-fitted at the inwardly facing surface of said housing wall.

17. A thermally responsive bearing assembly comprising:
- a shaft mounted for axial rotation;
- a radial bearing including an inner race mounted on said shaft and an outer race;
- a bearing support spigot having a centrally disposed radially extending flange with spaced bolt receiving apertures, a first hub extending toward said bearing from one flange side and a second hub which extends in an opposite direction from the opposite flange side;
- said bearing support spigot also having on said first hub a first inner facing surface for receiving the outer bearing surface, and on said second hub an outer facing cylindrical surface;
- a housing wall extending in a direction generally perpendicular to the shaft rotation axis with spaced bolt receiving apertures aligned with corresponding apertures in said spigot, said wall further having an inwardly facing cylindrical surface located radially inwardly of said bolt receiving apertures and positioned in radial alignment with the outwardly extending cylindrical surface of said second hub;
- a liner having an outwardly facing cylindrical surface in contact with the inwardly facing cylindrical surface of said housing wall and an inwardly facing cylindrical surface in contact with the outwardly facing cylindrical surface of said second hub;
- wherein a cylindrical wall of the second hub has a predetermined radial thickness that is substantially uniform except for an undercut at the junction between the flange and the outer cylindrical surface, said undercut being sufficient to allow a resilient relief without fracture of said second hub at low temperatures due to compression forces caused by contraction of said housing wall and liner; and wherein the radius of the undercut is about 20% of the radial thickness of said second hub wall.

18. A thermally responsive bearing assembly as defined in claim 17 wherein the thickness of said second hub wall is about 0.2 inches.

19. A thermally responsive bearing assembly as defined in claim 17, wherein said first and second hubs are thermally coupled to each other.

20. A thermally responsive bearing assembly as defined in claim 17, wherein said liner is press-fitted on the outer facing cylindrical surface of said second hub.

21. A thermally responsive bearing assembly as defined in claim 17, wherein said liner is press-fitted at the inwardly facing surface of said housing wall.

* * * * *